Figure 10:
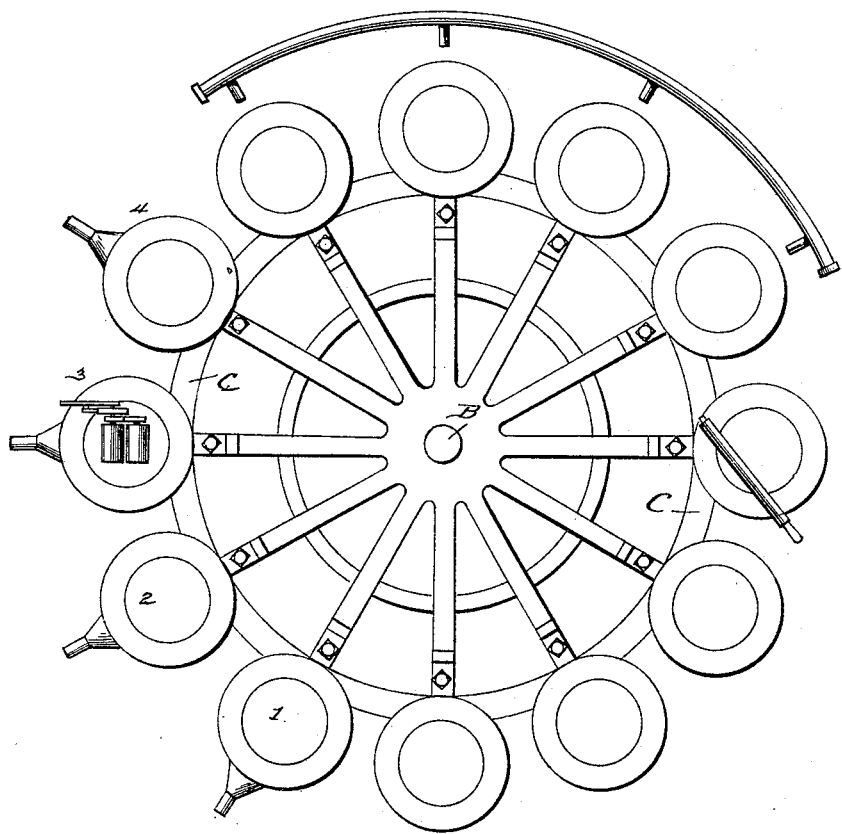

(No Model.) 3 Sheets—Sheet 1.
W. D. BROOKS.
CAN SOLDERING MACHINE.
No. 389,438. Patented Sept. 11, 1888.
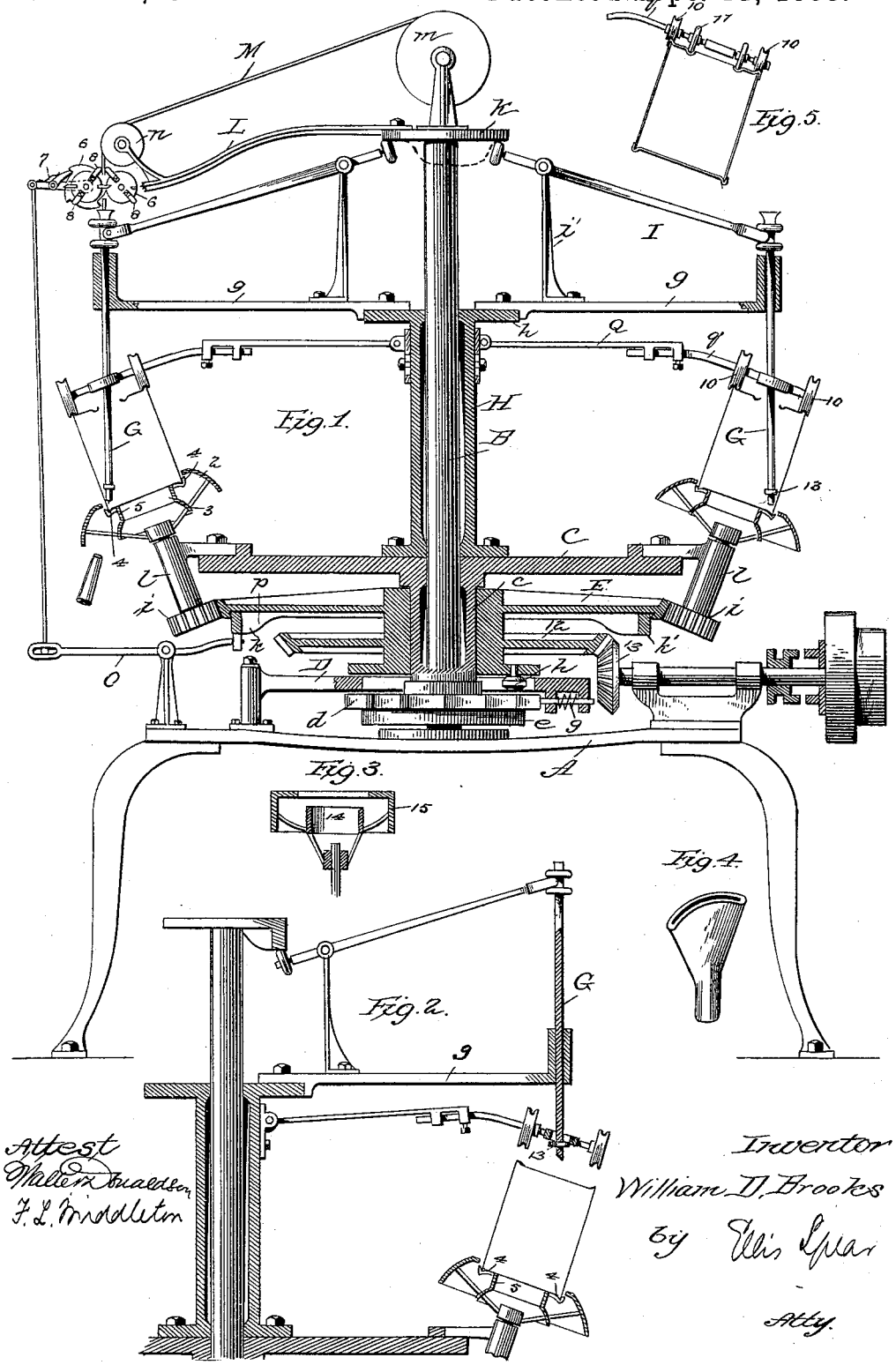
Attest
Walter Donaldson
F. L. Middleton
Inventor
William D. Brooks
by Ellis Spear
Atty.

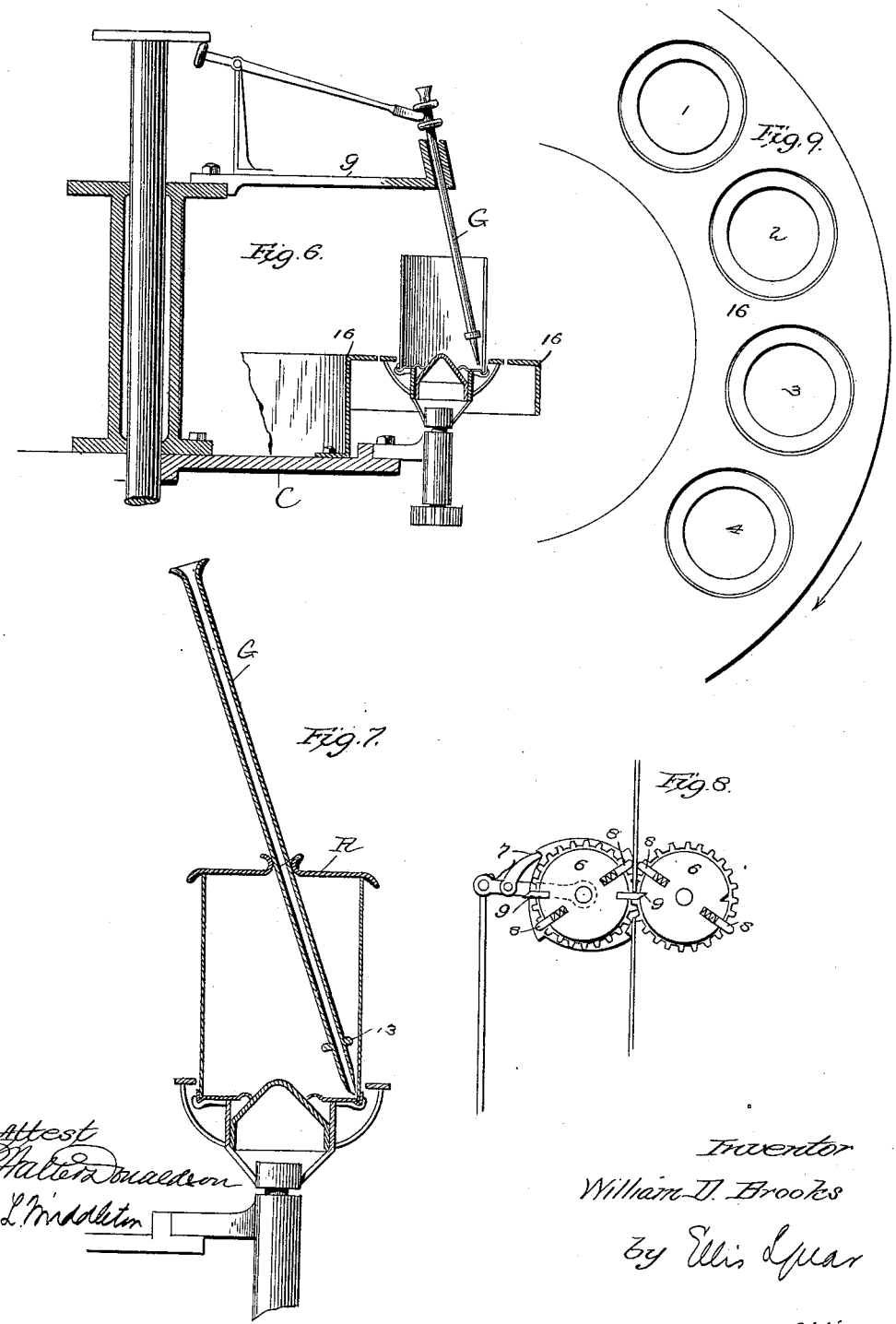

(No Model.) 3 Sheets—Sheet 3.

W. D. BROOKS.
CAN SOLDERING MACHINE.

No. 389,438. Patented Sept. 11, 1888.

United States Patent Office.

WILLIAM DYER BROOKS, OF BALTIMORE, MARYLAND.

CAN-SOLDERING MACHINE.

SPECIFICATION forming part of Letters Patent No. 389,438, dated September 11, 1888.

Application filed June 15, 1888. Serial No. 277,190. (No model.)

*To all whom it may concern:*

Be it known that I, WILLIAM DYER BROOKS, of Baltimore, State of Maryland, have invented a new and useful Improvement in Can-Soldering Machines; and I do hereby declare that the following is a full, clear, and exact description of the same.

My invention is an improvement in can-soldering machines of that class in which cans are carried upon revolving seats on a revolving table or endless chain, by means of which the cans are turned and exposed to the heat of the flame and also shifted into position. These machines are in common use and are well known in the art of can-making.

The principal object of this invention is to secure more even application of the solder to the seam and to prevent destruction of the flux and scorching of the can during the operation of the soldering of the can, to economize the solder, and to make the seam more certain and secure.

In connection with the apparatus used for the purpose indicated above I have also sought to improve the means for holding down the can to its seat during the process of soldering. I have also sought to improve the forms of the flame-chambers, which direct the heat to the can at the proper point during the laying of the center and the sweating of the solder into the seam.

I have hereinafter explained my invention in connection with the old parts of the machine, those parts being described only so far as may be necessary to the understanding of the particular improvements hereinafter claimed.

The invention is illustrated in the accompanying drawings, in which—

Figure 1 represents the machine partly in central vertical section and partly in side elevation, all as hereinafter explained. Fig. 2 is a similar view of a part of Fig. 1, showing the parts in different positions. Figs. 3, 4, and 5 are detail views of particular parts and modifications. Fig. 6 is a view similar to Fig. 2 with the modified form of the flame-chamber. Figs. 7 and 8 are enlarged detail views. Fig. 9 is a plan view of a part of the revolving table. Fig. 10 is a plan view of the table, showing the stations for heating and cooling; also, the solder-feeding and discharge station.

In the drawings, A represents the table upon which the mechanisms are supported, with a central post, B, fixed thereto. The revolving table C has a hub or sleeve, $c$, around the post which passes up through it and through the table. The lower end of the sleeve has a ratchet-wheel, $d$, below which is a smooth bearing-surface, $e$, forming a friction-wheel against which a brake may be made to bear for steadying the motion. The ratchet-wheel $d$ is operated by a lever, D, carrying a spring-pawl, $g$, which is moved by an arm, $h$, working within a cam-shaped opening in the lever. This arm is on the hub of the master-wheel E and operates the lever D to move the table one step at each revolution of the master-wheel E. The master-wheel E is moved by means of a bevel-gear, 12, on its hub, which meshes with a bevel-gear, 13, on the main driving-shaft. The master-wheel is in mesh with pinions $i$ on the lower end of the spindles of the can-seat. I have designed the can-seats of this machine to be twelve in number, although the number may be varied. They are supported on brackets 1, fixed to the revolving table C.

The general construction of the can-seats and the shields or walls about them, which form a chamber or serve to guide the flame to the seam of the can, are substantially the same as those heretofore known. The can is seated securely, and shields or walls 2 3 guide the flame to the exposed seam or can-seat. In the form shown the can is held in place by slender curved fingers 4 on the margin of the short cylindrical support 5. The shields 2 are curved downward the better to direct the flame.

It will be understood that the cans are brought in succession by the intermittent movement of the table C to the flames, and are revolved by the revolution of the master-wheel continuously in front of the flames.

Heretofore in machines of the class above described the solder has been introduced into the can by dropping it in at the opening at the upper end, the inclination of the can and the centrifugal motion causing the lump of solder when melted to move around as the can revolves and spread upon the seam. While this mode of soldering has been found a practical and successful one, some difficulty has attended it. The solder being dropped upon one side remains in its position in the bottom of the can, and sometimes before it is melted the flux on the other side of the can will be dissipated by the heat, and the can is consequently scorched. Furthermore, the spreading of the solder upon the seam is wholly dependent upon the action of gravity or the centrifugal force due to the turning of the can with its seat.

In order to provide for the positive spreading of the solder, I have devised what I shall call a "spreader." For purposes hereinafter explained, I have made this spreader in the form of a tube; but for the function of spreading the solder over the seam its tubular form is not essential. The spreader is shown at G. It is supported in a bracket, g, fixed radially on a table, h, set upon the upper end of a sleeve or hub, H, carried upon the table C, so that the spreader is always held in exact relation to the can seat.

It will be understood that there is a spreader, as above described, for each can-seat. The spreader is arranged to move up and down freely in a sleeve on the end of the arm g. In the form shown in Fig. 1 the can-seats are shown as arranged in an inclined position, and the spreaders are consequently set in a vertical position; but when the can-seats are in horizontal positions, as shown in Fig. 6, the spreaders are set at an inclination. Each spreader is swiveled to the end of one of a series of levers, I, pivoted on posts i' on the arms g, and provided at their inner ends with friction-rollers, which bear upon the cam-face of a disk, K, set on the top of post B. The lower end of the spreader when down projects in line with the seam in the bottom of the can and about one-eighth of an inch from the bottom.

The relative movements of the parts will be described hereinafter.

With the spreader as above described the solder might be dropped into the can, as has been heretofore done; but there are objections to this mode of supplying the solder not wholly obviated by the use of the spreader. For this class of work boys are chiefly employed, and these are sometimes inattentive or inexperienced. It happens sometimes, therefore, that, through the carelessness of the boy, a can will pass by him without receiving the solder, and there is liability also that the solder when dropped in will not fall in proper place relative to the spreader in order to be acted upon thereby. I have therefore made the spreader in the form of a tube, and provided means for feeding the solder in pieces of proper size into the tube, so that it may fall by gravity to the lower end thereof and be guided into place and always with certainty in proper relation to the spreader. In fact, the solder is held in the lower end of the spreader under all circumstances and carried positively thereby, while the can revolves and brings the seam in contact with the solder with a positive motion.

In machines of this class ordinarily four burners are used at four successive stations—for example, as at stations 1 2 3 4 at Figs. 9 10. I have arranged to drop the solder in the can when it has reached the third station and after the can has been subjected to the flame at the first station. In order to drop the solder at the proper station, I have arranged directly over it mechanism for supplying a piece of solder automatically to the tubular spreader. This apparatus is supported on arm L, fixed to the top of the post. It consists of a pair of feeding-disks, 6, geared together and provided with a pawl-and-ratchet mechanism, 7, to give them intermittent movement for the purpose of feeding the wire. Spring-plugs 8 are set in the faces of the disks, so as to grip the wire and draw it down between the rollers. Knives 9 are set in the face of one roller, so as to act in connection with the other to sever the wire. The solder-wire (shown at M) is brought from the drum m, mounted on top of the post, and is carried over a grooved pulley, n, which guides it to the feed and cutter rollers. The upper end of the spreader-tube is made flaring, and is located directly under the knife, so that the piece of solder severed from the wire drops directly into the mouth of the tube, and thence is conducted to the seam. The feed and cutter rollers are connected by a rod to a lever, O, the inner end of which is operated by a cam-track, p, on the under side of the wheel E.

In order to steady the cans upon their seats with the least possible friction, I have provided rollers arranged to turn freely upon a pivoted arm and to bear upon the upper end of the can. In Fig. 1 these rollers or wheels are shown at 10, mounted upon an arm, q, which is adjustable in a pivoted bracket, Q, on the sleeve H. The arm q has a loop or bend between the wheels, through which the tube passes. The wheels may be set, as shown in Fig. 10, to bear upon the edges, in which case they are grooved; but I may provide wheels with a rounded periphery to bear upon the groove which receives the cap, as shown in Fig. 5 at 11, and I may use these two sets of wheels together or I may use either alone. Obviously, on the same principle, I may use four wheels, bearing either upon the edge as the wheels 10 turn or upon the cap-groove as the wheels 11 turn. In order that these wheels may be lifted from the can automatically, I place a collar or cross-bar, 13, near the lower end of the spreader, so that as the spreader is lifted it lifts the wheel-bracket with itself clear of the can. The bracket may hold the can in place by its own gravity, and while I have described more than one wheel I do not confine myself to that, as a single wheel may be made to answer the purpose, in which case the wheel would have to run in the groove about the opening in the can-head, as at 11, Fig. 5. I may use a disk, R, in soldering the heads of cans, as in Fig. 7, to act as a cover for the open end of the can. When soldering the heads of the cans they are arranged vertically, and the disk acts to close the open end in order to keep in the heat. When the can-seats are inclined as in Fig. 1, the disks shown as carried by the spreader would not be serviceable as a holding means. The disk R is provided with a central hole through which the spreader passes, the spreader being provided with a pin or collar for lifting the cover when it rises in the same manner as the wheels are lifted.

As before stated, the solder cutting and feeding apparatus is arranged, preferably, over the third station. The parts are so geared that, preferably, when the table C revolves in step-by-step movement it is arrested for about five seconds with the cans in front of the flames, it being understood that the cans are all the while rotated. At the first two stations the can is without solder and is alone subjected to the heat; thence it moves on to the third station at the second revolution of the wheel E. Just as it reaches this station and comes into position to receive the solder through the spreader-tube the inner end of the lever O rides upon the cam-track $p$ and feeds a piece of solder through the mechanism described to the spreader-tube. In this position the inner end of the lever I is on the low part of its cam-track, and the tube is down. The cutting and feeding apparatus is preferably operated twice in a complete revolution of the wheel E to feed sufficient solder for each can, and the high parts $k\ k'$ of the cam-track $p$ are arranged on the under side of the wheel E for accomplishing this action. The low part of the cam-track K is opposite a point a little in advance of the first flame-station and terminates a little in advance of the ninth station, where the high part depresses the inner end of the lever I and lifts the spreader, together with the can-steadying device, so that the can may be removed and a fresh can put in its place. This is shown in Fig. 2.

The tubes which conduct the flame to the cans are not shown in place, but are of the ordinary form—such, for example, as that shown in Fig. 4. Fig. 3 shows another form of the can seat and guard for the flame, the can-seat being shown at 14, and the guard or shield at 15, the whole figure being in central vertical section. In Figs. 6 and 9 is shown another form, in which the shield which conducts the flame and retains it about the can is shown at 16 fixed to the table C, with the can-seat revolving within it.

While I have shown a spreading-tube or spreading-rod in connection with a revolving table, I do not, of course, limit myself to this combination as it may be used in any form of can-machine in which the cans are revolved under the heat.

I claim as my invention—

1. In combination, a revolving can-seat, a spreader arranged to project into close proximity to the can-seat and thus to extend into the can to a point near the seam, and means for giving the spreader a longitudinal reciprocating movement, substantially as described.

2. In combination with a revolving can-seat, a spreader arranged to project into close proximity to the can-seat and thus to extend into the can to a point near the seam, said spreader being held in a suitable bearing to have sliding movement toward and from the can-seat, substantially as and for the purpose described.

3. In combination with a revolving can-seat, a tubular spreader for directing and distributing the solder arranged to project into the can to a point near the seam, substantially as and for the purpose described.

4. In combination with a revolving can-seat, a tubular spreader for directing and distributing the solder, and a feeding and cutting mechanism, substantially as and for the purpose described.

5. In combination, a revolving table carrying a series of revolving can-seats, a series of arms carried with said table supporting vertically-moving spreaders arranged to project into the can to a point near the lower part thereof, and mechanism for raising and lowering said spreaders, all substantially as and for the purpose described.

6. In combination, the revolving table, the series of revolving can-seats thereon, the series of tubular spreaders for directing and distributing the solder carried with the table, means for raising and lowering the said spreaders, and stationary cutting and feeding mechanism for the solder-wire, substantially as described.

7. In combination, the revolving can-seat and the pivoted arm carrying a wheel or wheels arranged to bear upon the can, all substantially as described.

8. In combination with the revolving can-seat, the pivoted arm carrying a wheel or wheels, said arm being combined also with a spreader arranged to lift the arm when the spreader rises, substantially as described.

9. In combination, a revolving can-seat, a holding-wheel arranged to bear upon the can, and a support for said wheel, substantially as described.

WILLIAM DYER BROOKS.

Witnesses:
FELIX R. SULLIVAN,
C. C. POULTNEY.